US008342334B2

(12) United States Patent
Leibreich et al.

(10) Patent No.: US 8,342,334 B2
(45) Date of Patent: Jan. 1, 2013

(54) CORNERBOARD APPARATUS AND METHOD FOR POSITIONING THE SAME ON A CONTAINER

(75) Inventors: Andy Leibreich, Loveland, OH (US);
Mike Leibreich, Cincinnati, OH (US);
Tom Leibreich, Cincinnati, OH (US)

(73) Assignee: N.A.L. Company, Mt Orab, OH (US)

( * ) Notice: Subject to any disclaimer, the term of this patent is extended or adjusted under 35 U.S.C. 154(b) by 0 days.

(21) Appl. No.: 12/790,017

(22) Filed: May 28, 2010

(65) Prior Publication Data
US 2011/0293398 A1    Dec. 1, 2011

Related U.S. Application Data

(60) Provisional application No. 61/217,814, filed on Jun. 4, 2009.

(51) Int. Cl.
*B65D 81/02* (2006.01)
(52) U.S. Cl. .................................. 206/586; 248/345.1
(58) Field of Classification Search .................. 206/453, 206/521, 585, 586, 591, 593; 248/345.1
See application file for complete search history.

(56) References Cited

U.S. PATENT DOCUMENTS

| 1,786,189 | A | * | 12/1930 | Bowersock | 206/586 |
|---|---|---|---|---|---|
| 3,337,111 | A | * | 8/1967 | Petriekis et al. | 206/586 |
| 3,843,038 | A | * | 10/1974 | Sax | 206/586 |
| 3,900,156 | A | * | 8/1975 | Clark, Jr. | 206/586 |
| 3,955,677 | A | * | 5/1976 | Collingwood | 206/453 |
| 4,127,192 | A | * | 11/1978 | Card | 206/586 |
| 4,360,145 | A | * | 11/1982 | Wilcox | 206/586 |
| 4,385,698 | A | * | 5/1983 | Goguen | 206/586 |
| 4,529,091 | A | * | 7/1985 | Martin | 206/586 |
| 5,372,255 | A | * | 12/1994 | Skorski et al. | 206/586 |
| 6,012,587 | A | * | 1/2000 | McCullough | 206/586 |
| 6,207,249 | B1 | * | 3/2001 | Lencoski et al. | 206/586 |
| 7,913,896 | B2 | * | 3/2011 | Reinkensmeyer | 206/586 |

* cited by examiner

Primary Examiner — Bryon Gehman
(74) Attorney, Agent, or Firm — David J Smith

(57) ABSTRACT

An improved cornerboard that is usable to protect a corner of a shipping container is provided. The cornerboard reduces workforce required to secure the cornerboard to a plurality of shipping containers, such as a pallet of shipping containers. For example, the cornerboard permits a single individual to position cornerboards about the pallet of shipping containers and shrink wrap or otherwise secure the shipping containers with the cornerboards. In an embodiment, the cornerboard has a tab portion that is partially separable form the cornerboard and positionable between two shipping containers to prevent movement of the cornerboard and eliminate the need for an individual to hold the cornerboard.

18 Claims, 5 Drawing Sheets

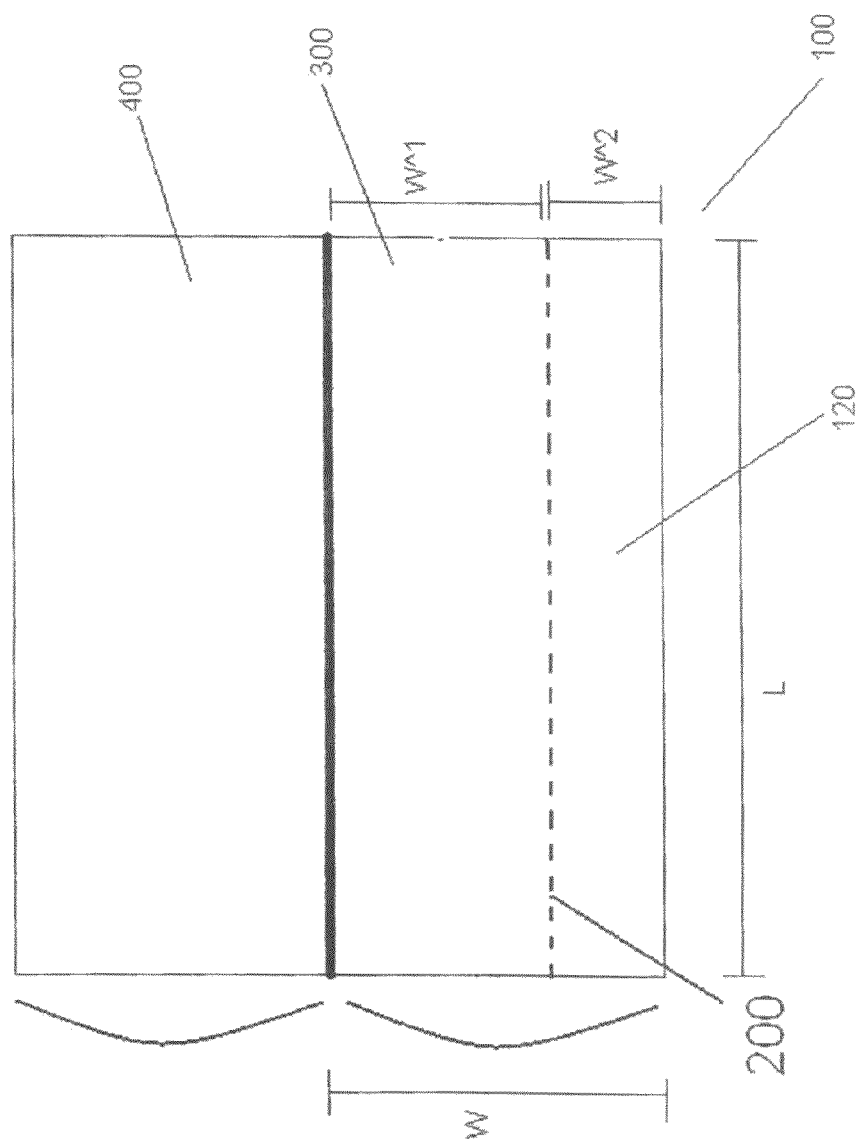

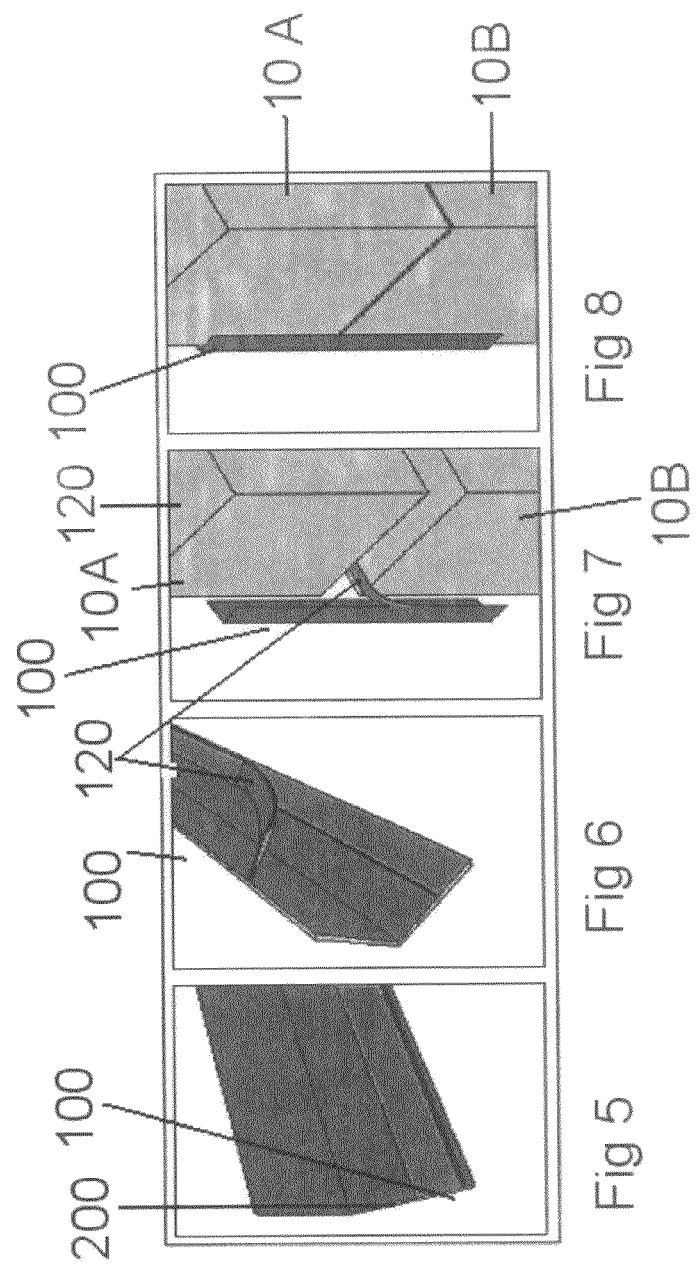

CORNERBOARD APPARATUS AND METHOD FOR POSITIONING THE SAME ON A CONTAINER

This application claims priority from U.S. Patent Ser. No. 61/217,814, filed on Jun. 4, 2009, entitled "Corner Board Apparatus and Method for Positioning the Same on a Container," which is hereby incorporated by reference in its entirety.

BACKGROUND OF INVENTION

Shipping products in bulk is common in today's marketplace. Frequently, it is expeditious to ship a large number of relatively small containers of products together. Prior to shipment, the containers are typically positioned on a pallet for transportation. The pallet provides ease in transporting and handling the large number of containers. FIG. 2 illustrates an example of a shipping container 10 on a pallet 12. The pallet 12 is also generally sized and shaped for lifting by a forklift. However, in order to protect the containers 10 and support the containers 10 during stacking and transportation, a cornerboard 5 is positioned along the corner of the stacked containers. As shown in FIGS. 1 and 2, the cornerboards 5 are typically produced from laminating multiple layers of paperboard and forming them into a "V" or 90 degree angle, as shown in FIG. 1. For example, known cornerboards 5 are fabricated or manufactured from a plurality of alternating paper plies having alternative width dimensions that are bent at a common central portion at an angle of 90 degrees.

In order to secure the containers 10 as well as the cornerboards 5, the cornerboards 5 are typically positioned along each of the corners of the stacked containers 10, as shown in FIG. 2, prior to banding the containers together. The cornerboards 5 then support the containers 10 during shipping, ease in stacking and protect the containers 10 from damage.

However, in order to properly position and maintain the cornerboard 5 precisely on the corner of the pallet 12 of containers 10, at least two shipping personnel or employees are required. Specifically, at least one shipping personnel or employee is required to hold one of the cornerboards 5 in position, and at least one other shipping personnel or employee bands, such as shrink wraps, the containers 10 and each of the cornerboards 5 together. Most often, the containers 10 and the cornerboards 5 are banded in stages, for example, corner by corner, because the employee can only hold one cornerboard 5 against the containers 10 at a time. Alternatively, a shipping personnel or employee may be positioned at each of the corners of the containers 10 and pallet 12, and each employee may hold one of the cornerboards 5 as another employee bands the cornerboards 5 to the containers 10 and the pallet 12. In such a method, at least 5 employees are required. Accordingly, these methods are time consuming and costly. Multiple employees are required to position cornerboards 5 and secure the cornerboards 5 to the containers 10 for each pallet 12. In the shipping and manufacturing industry, reducing the cost of labor and the time required to ship products can significantly increase profit.

DESCRIPTION OF DRAWINGS

FIG. 4 illustrates a cornerboard prior to folding and/or bending in an embodiment of the present invention.

FIG. 5 illustrates a cornerboard having a perforation in an embodiment of the present invention.

FIG. 6 illustrates a cornerboard having a tab portion in an embodiment of the present invention.

FIG. 7 illustrates the cornerboard of FIG. 6 being inserted between two containers in an embodiment of the present invention.

FIG. 8 illustrates the cornerboard of FIGS. 6 and 7 secured between the two containers in an embodiment of the present invention.

DETAILED DESCRIPTION OF EMBODIMENTS OF THE INVENTION

Figure 1:
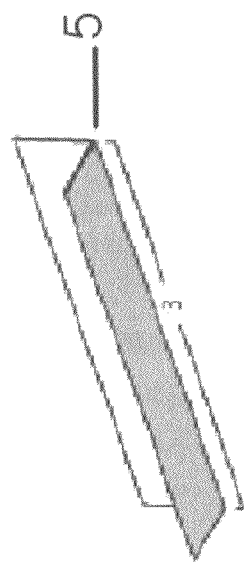
FIG. 1 illustrates a prior art cornerboard.
Figure 2:
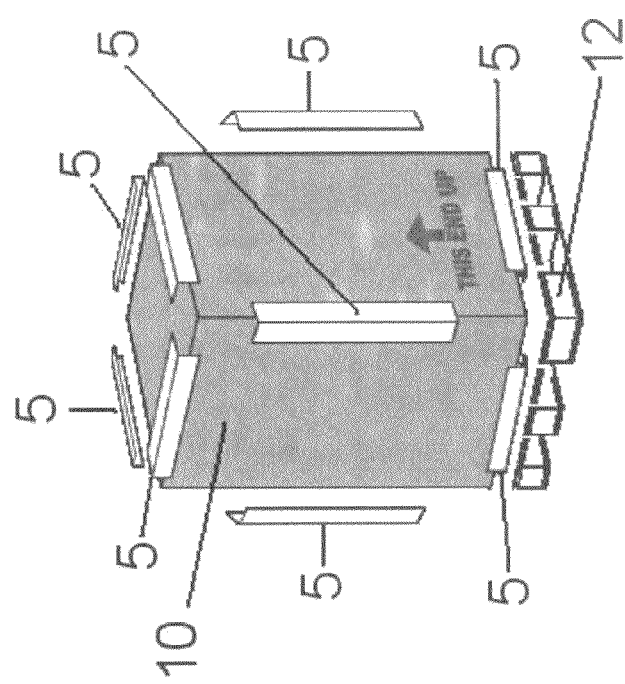
FIG. 2 illustrates the prior art cornerboard of FIG. 1 positioned on a container and pallet.
Figure 3:
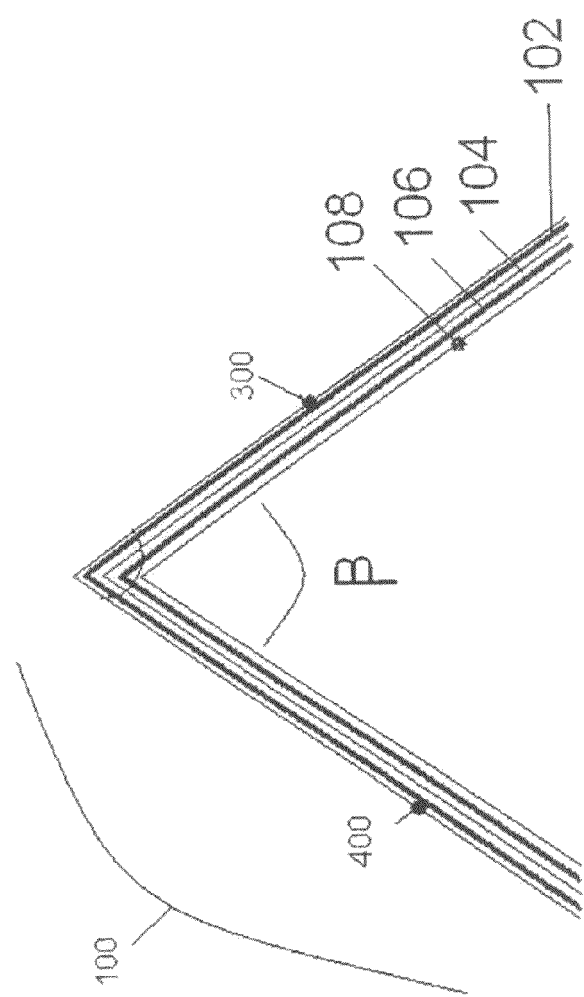
FIG. 3 illustrates a cornerboard formed into an angle in an embodiment of the present invention.

FIG. 3 illustrates a cornerboard 100 in an embodiment of the present invention. The cornerboard 100 may be manufactured from one or more layers of substrate capable of supporting and/or protecting corners, edges or other surfaces of a component, such as the shipping container 10 and the pallet 12 of FIG. 2. The cornerboard 100 may be attachable, removably attachable or otherwise securable to the shipping container 10 and/or the pallet 12. While the present description refers to use of the cornerboard 100 with the shipping container 10 and the pallet 12 of FIG. 2, it should be readily appreciated by a person having ordinary skill in the art that the cornerboard 100 may be used on numerous components. For example, the cornerboard 100 may be positioned on a container containing one or more objects, such as the shipping container 10. The cornerboard 100 may also be positioned directly on equipment, supplies or any other item requiring shipment, support, protection, and/or shipping assistance provided by the cornerboard 100.

As shown in FIG. 3, the cornerboard 100 may have a first substrate layer 102, a second substrate layer 104, a third substrate layer 106, and a fourth substrate layer 108. It should be appreciated that the cornerboard 100 may have any number of layers, including a single layer. The layers 102, 104, 106, 108 may be made of any substrate capable of providing protection to a corner of a shipping container, pallet or other product being protected from the cornerboard 100. In an embodiment, the layers 102, 104, 106, 108 are made of a pulp based substrate, such as paper, cardboard, recycled paper, or a paper substitute, such as hemp. The layers may be secured or adhered together to form the cornerboard 100, such as by a lamination or adhesive process.

In the embodiment shown in FIG. 3, the layer 108 may be referred to as a top layer—or layer that will be positioned adjacent the shipping container 10 when the cornerboard 100 is positioned on the shipping container 10. The layer 102 may be referred to as the bottom layer, or layer furthest from the shipping container 10 when the cornerboard 100 is positioned on the shipping container 10. The layers 102, 104, 106, 108 of the substrate may have substantially similar widths, lengths and thicknesses. In an embodiment, the layer 108 may have a width greater than the layer 106, and the layer 106 may have a width greater than the layer 104 and the layer 102. The present invention, however, should not be limited to any specific dimensions, number of layers, or type of substrate, as those having ordinary skill in the art will appreciate that various dimensions, number of layer, and type of substrates may be used within the spirit of the present invention.

The cornerboard 100 may form a predetermined angle β, as shown in FIG. 3. In a preferred embodiment, the angle β is sized to mate with a corner, edge or other portion of the shipping container 10 in which the cornerboard 100 is to be positioned. In a preferred embodiment, the angle β may be an angle substantially similar to a corner or edge of the shipping container 10 and/or the pallet 12 or other component in which the cornerboard 100 may be used. Other non-limiting examples of the angle β include an angle greater than 10 degrees, greater than 25 degrees, greater than 45 degrees, less than 135 degrees and substantially equal to 90 degrees. The angle β may be positioned between a first portion 300 and a second portion 400 of the cornerboard 100. The first portion 300 and the second portion 400 may have substantially similar widths, as shown in the embodiment of FIG. 3.

FIG. 4 illustrates an embodiment of the first portion 300 and the second portion 400 prior to being formed into the angle β. The portions 300, 400 may be formed of the layers 102, 104, 106, 108. The topmost layer, shown in the embodiment of FIG. 3 as the layer 108 may have a tab 120 formed from a portion of the width of the topmost layer 108. The tab 120 may be a portion of the layer 108 that is delaminated, separate from or otherwise unsecured the layers 102, 104, 106.

The tab 120 has at least a portion that is removably secured to the layer 108 such that a portion of the tab 120 may be torn, bended or otherwise separated from the layer 108. In an embodiment, a portion of the layer 108 forming the tab 120 is partially delaminated to provide ease in tearing or otherwise partially separating the layer 108 from the other layers 102, 104, 106. In the embodiment of FIG. 4, the layer 108 is delaminated along the a width $W_2$, which represents a portion of the width W of the first portion 300. The layer 108 may be delaminated along the entire length L of the first portion 300, or only a portion of the length L of the first portion.

Although the tab 120 is shown as comprising only a portion of the topmost layer 108, it should be appreciate that the tab 120 may be comprised of more than one of the layers 102, 104, 106, 108. The tab 120 may comprise any portion of the width W of the first portion 300, such as a relatively small portion of the width W, half of the width W, or substantially the entire width W of the first portion 300. The tab 120 is comprised of a predetermined portion of the width W, namely $W_2$, of the first portion 300 as shown in FIG. 4. Of course, the tab 120 may also be comprised of a portion of the width of the second portion 400. In an embodiment, the tab 120 may be formed on the first portion 300 and the second portion 400 such that two of the tabs 120 are present in the cornerboard 100.

A perforation 200 may be provided on the cornerboard 100 to separate at least a portion of the tab 120 from the layers 102, 104, 106, 108. Although not required for the invention, the perforation 200 may ease in separating the tab 120 from the layers 102, 104, 106, 108. For example, the tab 120 may also be separated by tearing or ripping the tab 120 from the layer 108. In addition, the layer 108 may be immediately perforated at the tab 120 to decrease curing time of the adhesive. An embodiment of the perforation 200 is shown in FIG. 4. The perforation 200 is positioned at an edge of the tab 120 where the portion of the topmost layer 108 is unsecured from the other layers 102, 104, 106 of the cornerboard 100. In other words, the layer 108 may be secured along a width $W_1$ and unsecured along width $W_2$. The perforation 200 is ideally positioned between the width $W_1$ and the width $W_2$. The tab 120 may also have multiple perforations along at least a portion of its length, such that the tab 120 is teerable away from the topmost layer 108 of the cornerboard 100. The perforation 200 may extend substantially along the length L of the cornerboard 100 as shown in FIG. 4 or may extend only partially along the length L of the cornerboard 100. The length of the perforation 200 may correspond to a predetermined size of the tab 120 and/or a predetermined height of the cornerboard 100 required above a first shipping container and below a second shipping container, which will be further described with reference to FIGS. 7 and 8.

In an embodiment, a perforation wheel may be used to provide the perforation 200 to the cornerboard 100. The perforation wheel may utilize cut and tie style cutting by having a cut portion and a tie portion. For example, the cut portion of the perforation wheel may form depressions in the layer 108 of the cornerboard 100. The tie portion of the perforation wheel may provide a gap between each cut or depression. The tie portion of the perforation process may also hold the depressions or cuts together. The cornerboard 100 may be moved and/or may be pressed between the perforation wheel and a solid bottom rider roller in order to form the perforation 200.

The perforation cut and tie may be manufactured to form any size perforations, such as small gaps or large gaps. Generally, the smaller the cut and tie the more easily the perforation 200 will tear. The perforation wheel may be adjusted to perforate the cornerboard 100 and/or the layer 108 at various predetermined widths. With this added flexibility or range of both perforation gaps and widths, numerous product dimensions and specifications can be achieved for each individual application thus personalizing the cornerboard 100 to any required application.

FIGS. 6 and 7 illustrate a portion of the tab 120 torn, bent, ripped, cut, or otherwise separated from the layer 108. For example, a portion of the layer 108 may be torn along the perforation 200 to create the tab 120. The tab 120 may protrude at an angle from the layers 102, 104, 106, 108 such as substantially perpendicularly from the layers 102, 104, 106, 108 of the cornerboard 100. As shown in FIG. 8, the tab 120 of the cornerboard 100 may be used to secure and/or position the cornerboard 100 to the shipping container 10. For example, the tab 120 may be positioned between the first and second shipping containers 10a, 10b as shown in FIG. 8. In the example of FIG. 8, the tab 120 is sandwiched in between the shipping containers 10a, 10b in order to maintain the position of the cornerboard 100 with respect to the shipping containers 10a, 10b. The tab 120 may be held or forced against the shipping container 10a by the force (e.g. weight) of the shipping container 10b to secure the cornerboard 100 to a corner of the shipping containers 10a, 10b. Advantageously, in this embodiment, the cornerboard 100 may be positioned on a corner of the shipping containers 10a, 10b without the use of tape or any other adhesive, and the finished product may be packaged for shipment without requiring additional assistance in holding the cornerboard 100. Therefore, the cornerboard 100 reduces handling time, packaging time, and presents an economical solution to "hands free" packaging.

It should be appreciated that the amount of the tab 120 separated form the layers 102, 104, 106, 108 of the cornerboard 100 corresponds to a portion of the length L of the cornerboard 100 on the first shipping container 10a and a portion of the length L of the cornerboard 100 extending on the second shipping container 10b. For example, when the tab 120 is positioned between the shipping containers 10a, 10b, a portion of the length L of the cornerboard 100 will be positioned above the tab 120 and a portion of the length L will be positioned below the tab 120; and, as a result, the portion of the length L above the tab 120 may be substantially similar to the portion of the length L of the cornerboard 100 above the tab 120. Of course, it is possible to separate a portion of the tab 120 that will have a length greater than the length of the cornerboard 100 positioned above the tab 120 by only positioning a portion of the separated tab 120 between the shipping containers 10a, 10b and allowing the remaining portion to be adjacent the face of the shipping container 10b.

A person having ordinary skill in the art will appreciate that the cornerboard 100 may be manufactured and produced in numerous manners depending on, for example, the use of the cornerboard 100, the predetermined shape and dimensions (e.g. length, width, thickness) of the cornerboard 100, the angle β of the cornerboard 100 or other feature of the cornerboard 100 or its use. The following is a list of steps that may be performed to manufacture the cornerboard 100.

1. Raw paperboard, which may be in the form of a roll, is provided and prepared for production of the cornerboard 100.
2. Various roll widths and thicknesses of paperboard are drawn across rewinding machines slitting ribbons of various web widths and thicknesses to be converted into the layers of the cornerboard 100.
3. Ribbons consisting of predetermined widths and various predetermined calipers are applied to the process of the cornerboard machine.
4. The predetermined number of ribbons are aligned, laminated, pressed and formed into the angle β whereby a crude length is determined to minimize spoilage.
5. While step 4 is being applied, at least a portion of the top layer of the cornerboard 100 is delaminated resulting in a top ply of paperboard that is loose and not secured to the other layers of the cornerboard 100, such as not laminated to the ply directly below.
6. The top, delaminated ply is then drawn in between a solid roller wheel and a predetermined cut and tie perforation wheel where the top ply is at least partially perforated and laminated to the rest of the plies.
7. Once formed, the cornerboards 100 are cut to a crude length.
8. The predetermined number of the cornerboards 100 are bundled or positioned together, and may be sent through a precision cutting process to satisfy predetermined dimensions of a customer and/or shipping container
9. The cornerboards 100 may be stacked, bundled and shipped.

Alternate variations will be readily appreciated by a person having ordinary skill in the art. For example, the layer 108 may have more than one perforated section such that multiple tabs 120 may be formed. In such an embodiment, one of the tabs 120 may be positioned between a first and a second shipping container, and one of the other tabs may be positioned between a third container and the second shipping container. In addition, the tab 120 may have an adhesive for securing to the shipping container. Another variation may involve the use of adhesive on any one of the layers of the cornerboard 100. For example, the non-perforated section (the portion not forming the tab 120) may have an adhesive for securing the cornerboard 100 to the shipping container. In another embodiment, a removably ply may be positioned between the layer 108 and the other layers, and tearing the layer 108 along the perforation 200 may expose the removably ply. In such an embodiment, the removable ply may be removed to expose an adhesive on the tab 120. In this embodiment, the removably ply may only extend along a portion of the width $W_1$ of the tab 120 such that the layer 108 may still be at least partially adhered, such as laminated to the other layers of the cornerboard 100.

Advantageously, the cornerboard 100 can eliminate the requirement of using expensive tapes, adhesives and methods were used to apply a cornerboard to the sides, tops or bottoms of containers to protect them from damage during stacking for storage or while in transit by truck or forklift. The cornerboard 100 may also provide improved safety for shipping personnel by easing in installation and reducing need for repetitive movements. The cornerboard 100 is a protective product which can be applied to any item for packaging very quickly, cost effectively, and ergonomically. The cornerboard 100 may be installed before the shipping container or other object is transported by the forklift operator and/or before entering a banding process, such as a stretch wrap or packaging process. Therefore, the cornerboard 100 reduces time, labor and cost in handling the shipping container or other item by the shipping personnel, fork lift operator or other personnel.

What is claimed is:

1. A cornerboard positionable on a shipping container comprising:
   a plurality of paper layers secured together having a width, the plurality of paper layers formed at an angle sized for positioning on a corner of the shipping container; and
   a tab defined by only a single topmost layer of the plurality of paper layers and by a perforation extending substantially the entire length of the plurality of paper layers.

2. The cornerboard of claim 1 wherein the tab is separable from the plurality of paper layers and positionable on the shipping container.

3. The cornerboard of claim 2 wherein at least a portion of the tab is completely separable from the plurality of paper layers.

4. The cornerboard of claim 2 wherein the tab is foldable and positionable on a top of the shipping container.

5. The cornerboard of claim 4 wherein the tab is positionable between the shipping container and a second shipping container.

6. The cornerboard of claim 1 wherein the perforation extends at least partially through at least the single topmost layer such that a portion of the tab is separable from the plurality of paper layers.

7. The cornerboard of claim 1 wherein the angle is substantially 90 degrees.

8. A cornerboard positionable on a shipping container comprising:
   a first portion of the cornerboard having a first plurality of layers of a substrate adhered together;
   a second portion of the cornerboard having a second plurality of layers of the substrate adhered together and defining a width and a length, the second portion formed at an angle with respect to the first portion of the cornerboard, the angle substantially sized such that a corner of the shipping container is positionable between the first and the second portion; and
   a tab secured to at least one layer of the second plurality of paper layers and
   defined by a perforation extending along a major portion of the length of the second plurality of layers, wherein at least a first portion of the tab is completely separable from the second portion.

9. The cornerboard of claim 8 wherein
   a second portion of the tab remains secured to the at least one layer of the plurality of paper layers if the first portion of the tab is completely separated from the second portion.

10. The cornerboard of claim 9 wherein the substrate is paper.

11. The cornerboard of claim 10 wherein the tab is only connected to a single outermost layer of the second plurality of paper layers.

12. The cornerboard of claim 8 wherein the perforation extends along an entirety of the length of the cornerboard.

13. The cornerboard of claim 12 wherein the portion of the tab is tearable along the length of the second portion.

14. The cornerboard of claim 8 wherein the tab comprises a first width less than a second width of the second portion, and further wherein the tab comprises the first width of an outermost layer of the second portion.

15. A method for positioning a cornerboard on a first shipping container comprising:

providing a cornerboard defining a length defined between a top end and a bottom end, the cornerboard comprising a plurality of paper layers having a width a tab secured to the at least one layer of the plurality of paper layers along the length of the cornerboard and unsecured to the plurality of paper layers along a major portion of the length of the cornerboard wherein at least a first portion of the tab is completely separable from the plurality of paper layers, and further wherein the plurality of paper layers are adhered together; and positioning the tab on the first shipping container.

16. The method of claim 15 wherein the tab is positioned between the first shipping container and a second shipping container.

17. The method of claim 15 wherein a second portion of the tab remains connected to the plurality of paper layers if the first portion of the tab is completely separated from the plurality of paper layers.

18. The method of claim 17 wherein the tab is unsecured to the second plurality of paper layers along the entire length of the cornerboard.

* * * * *